US012686344B2

(12) United States Patent
Liu et al.

(10) Patent No.: US 12,686,344 B2
(45) Date of Patent: Jul. 21, 2026

(54) IMAGING METHOD, IMAGING APPARATUS, OPTICAL IMAGING SYSTEM, AND VEHICLE

(71) Applicant: YINWANG INTELLIGENT TECHNOLOGIES CO., LTD., Shenzhen (CN)

(72) Inventors: Xin Liu, Dongguan (CN); Han Zhao, Dongguan (CN); Shuyue Chen, Dongguan (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 828 days.

(21) Appl. No.: 17/986,483

(22) Filed: Nov. 14, 2022

(65) Prior Publication Data

US 2023/0085082 A1 Mar. 16, 2023

Related U.S. Application Data

(63) Continuation of application No. PCT/CN2021/092925, filed on May 11, 2021.

(30) Foreign Application Priority Data

May 15, 2020 (CN) .......................... 202010410182.5

(51) Int. Cl.
*B60R 11/04* (2006.01)
*H04N 23/80* (2023.01)

(52) U.S. Cl.
CPC ............. *B60R 11/04* (2013.01); *H04N 23/80* (2023.01); *B60R 2300/205* (2013.01); *B60R 2300/30* (2013.01)

(58) Field of Classification Search
None
See application file for complete search history.

(56) References Cited

U.S. PATENT DOCUMENTS

2010/0165429 A1 7/2010 Buckley et al.
2021/0165215 A1* 6/2021 Haussler .............. H04N 9/3194
2021/0325670 A1* 10/2021 Chen ...................... G02B 27/01

FOREIGN PATENT DOCUMENTS

CN 103792674 A 5/2014
CN 106415696 A 2/2017
(Continued)

OTHER PUBLICATIONS

International Search Report and Written Opinion in International Appln. No. PCT/CN2021/092925, mailed on Jul. 30, 2021, 18 pages (with English translation).

*Primary Examiner* — Richard H Kim
(74) *Attorney, Agent, or Firm* — Fish & Richardson P.C.

(57) ABSTRACT

This application provides an imaging method and an optical imaging system. One example method includes: obtaining a first modulation parameter, wherein the first modulation parameter is determined based on a first distorted image and a first target image, the first distorted image is an image presented after imaging processing is performed on a training image by using the optical imaging system and a screen, the first target image is an image of the training image, and distortion of the first target image falls within a preset range; and controlling the spatial light modulator to modulate an electrical signal of a to-be-imaged first image based on the first modulation parameter, and to generate an imaging light beam that is incident to human eyes through the lens and the screen.

20 Claims, 7 Drawing Sheets

(56) References Cited

FOREIGN PATENT DOCUMENTS

| | | | |
|---|---|---|---|
| CN | 108061968 | A | 5/2018 |
| CN | 109873997 | A | 6/2019 |
| CN | 109993713 | A | 7/2019 |
| CN | 110726381 | A | 1/2020 |
| JP | 2014199385 | A | 10/2014 |
| KR | 20070049109 | A | 5/2007 |
| TW | 201925856 | A | 7/2019 |

* cited by examiner

IMAGING METHOD, IMAGING APPARATUS, OPTICAL IMAGING SYSTEM, AND VEHICLE

CROSS-REFERENCE TO RELATED APPLICATIONS

This application is a continuation application of PCT application No. PCT/CN2021/092925, filed on May 11, 2021, which claims priority to Chinese Patent Application No. 202010410182.5, filed on May 15, 2020. The disclosures of the aforementioned applications are hereby incorporated by reference in their entireties.

TECHNICAL FIELD

This application relates to the field of image processing, and more specifically, to an imaging method, an imaging apparatus, an optical imaging system, and a vehicle.

BACKGROUND

Currently, in a known optical imaging system, a to-be-imaged image is processed in an electrical domain by a device such as an image processing unit to generate an electrical signal, the electrical signal is processed by an optical modulator to generate a light beam of the image, the light beam is emitted through one or more lenses, and the light beam is reflected by a screen and incident to human eyes, so that the human eyes observe an image of the image.

This technology is widely applied to, for example, a heads-up display (HUD) or an augmented reality (AR) heads-up display HUD. That is, a windshield of a transportation means such as a vehicle or an aircraft is used as the screen, to reflect the image to eyes of a driver.

However, in the conventional technology, if the screen (for example, the windshield) is disposed off-axis with respect to the optical imaging system, the image reflected to the human eyes by the screen is distorted, and consequently display quality of the image is limited to a great extent.

Currently, in a known technology, compensation processing is performed on an image in the electrical domain, to reduce image distortion of the image observed by the human eyes.

However, in the conventional technology, compensation processing needs to be performed on each image. For example, when there is a relatively high image pixel or a relatively high video frame rate, a delay of the compensation processing is greatly increased, and consequently an imaging delay is increased. In addition, there is a relatively high performance requirement on the image processing unit and the like, and processing costs are increased.

SUMMARY

This application provides an imaging method, an imaging apparatus, an optical imaging system, and a vehicle, to reduce an imaging delay and reduce processing costs.

According to a first aspect, an imaging method is provided. The method is applied to an optical imaging system. The system includes a spatial light modulator and at least one lens. The spatial light modulator is configured to modulate an electrical signal of an image to generate an imaging light beam of the image. The imaging light beam is incident to human eyes through the lens and a screen. The screen is disposed off-axis with respect to the optical imaging system. The method includes:

obtaining a first modulation parameter, where the first modulation parameter is determined based on a first distorted image and a first target image, the first distorted image is an image presented after imaging processing is performed on a training image by using the optical imaging system and the screen, the first target image is an image of the training image, and distortion of the first target image falls within a preset range; and controlling the spatial light modulator to modulate an electrical signal of a to-be-imaged first image based on the first modulation parameter.

Specifically, the first distorted image is an image presented after an electrical signal of the training image is modulated based on an original modulation parameter and reflected by the screen.

The first target image is an image that is expected to be observed by the human eyes when imaging is performed for a light beam of the image by using the screen.

In an implementation, an image of the first target image is determined based on an image of the first distorted image. For example, the image of the first target image includes a pixel area whose distortion degree falls within the preset range in the image of the first distorted image.

In the solutions according to this application, the first modulation parameter of the spatial light modulator is determined based on a distorted image and an image expected to be presented, and an electrical signal of a to-be-presented image is modulated based on the first modulation parameter. In this way, while distortion of an image of the to-be-presented image is reduced, a relatively large imaging delay that is caused because compensation processing is performed on the image in an electrical domain can be avoided, and processing costs that are increased because compensation processing is performed on the image in the electrical domain can be reduced.

The screen is disposed off-axis with respect to the optical imaging system (for example, the at least one lens).

There is relatively large distortion when the screen is disposed off-axis with respect to the optical imaging system. Therefore, the solutions according to this application can be applied to a scenario in which the screen is disposed off-axis with respect to the optical imaging system.

In an implementation, the method is performed by a processor in the optical imaging system.

In another implementation, the method is performed by the spatial light modulator in the optical imaging system.

In another implementation, the method is performed by a control module in the spatial light modulator.

Optionally, the obtaining a first modulation parameter includes: controlling the spatial light modulator to modulate the electrical signal of the training image based on the original modulation parameter, to obtain the first distorted image; adjusting the original modulation parameter, so that a deviation between the first distorted image and the first target image falls within the preset range; and determining an adjusted original modulation parameter as the first modulation parameter.

A process of determining the first modulation parameter is completed by a module in the optical imaging system. In this way, online processing can be implemented, so that applications in various different environments can be coped with, to improve practicability and reliability.

Optionally, the obtaining a first parameter includes: sending the image of the first distorted image to a server; and obtaining the first modulation parameter from the server.

Optionally, the method further includes: sending the training image to the server.

A process of determining the first modulation parameter is completed by the third-party server. In this way, a device burden caused by determining the first parameter can be reduced, and an imaging delay caused by determining the first modulation parameter online can be reduced.

Optionally, the method further includes: obtaining a first correspondence between K modulation parameters including the first modulation parameter and K image parameters, where a $k^{th}$ modulation parameter is determined based on a distorted image and a target image of a training image having a $k^{th}$ image parameter, the $k^{th}$ modulation parameter corresponds to the $k^{th}$ image parameter, K≥2, and k∈[1, K]; and the obtaining a first modulation parameter includes: determining a modulation parameter corresponding to an image parameter of the first image as the first modulation parameter based on the first correspondence.

Values of any two of the K modulation parameters are different, and values of any two of the K image parameters are different.

Alternatively, the method further includes: obtaining a first correspondence between a plurality of modulation parameters including the first modulation parameter and a plurality of image parameters, where each modulation parameter is determined based on a distorted image and a target image of a training image having an image parameter corresponding to the modulation parameter; and the obtaining a first modulation parameter includes: determining a modulation parameter corresponding to an image parameter of the first image as the first modulation parameter based on the first correspondence.

Specifically, for example, when the modulation parameter includes a Zernike coefficient, that values of any two of the K modulation parameters are different may be understood as that values of Zernike coefficients are different.

When each modulation parameter is a parameter group including a plurality of parameters, that values of any two of the K modulation parameters are different may be understood as that values of at least one of parameters included in two modulation parameter groups are different.

For example, when the image parameter includes an image size, values of image sizes in the any two of the K image parameters are different.

When each image parameter is a parameter group including a plurality of parameters, that values of any two of the K image parameters are different may be understood as that values of at least one of parameters included in two image parameter groups are different.

There may be different distortion for images having different image parameters. Therefore, imaging requirements of images having different image parameters can be flexibly met in this application, to further improve the practicability of this application.

Optionally, the image parameter includes at least one of the following parameters: an image size, an image color, an image shape, and image resolution.

Optionally, the method further includes: obtaining a second correspondence between M modulation parameters including the first modulation parameter and M positional parameters, where the positional parameter is used to indicate a positional relationship between the human eyes and the screen, an $m^{th}$ modulation parameter is determined based on a distorted image and a target image of the training image having an $m^{th}$ positional parameter, the $m^{th}$ modulation parameter corresponds to the $m^{th}$ positional parameter, values of any two of the M modulation parameters are different, and values of any two of the M positional parameters are different; and the obtaining a first modulation parameter includes: determining a modulation parameter corresponding to a positional parameter of the first image as the first modulation parameter based on the second correspondence.

Alternatively, the method further includes: obtaining a second correspondence between a plurality of modulation parameters including the first modulation parameter and a plurality of positional parameters, where the positional parameter is used to indicate a relative position that is between the human eyes and the screen and that exists when an image of an image is observed, each modulation parameter is determined based on a distorted image and a target image of a training image having a positional parameter corresponding to the modulation parameter; and the obtaining a first modulation parameter includes: determining a modulation parameter corresponding to a positional parameter of the first image as the first modulation parameter based on the second correspondence.

Different distortion may be observed when an image of an image is observed at different positions. Therefore, requirements of images observed at different positions can be flexibly met in this application, to further improve the practicability of this application.

Optionally, the positional parameter includes at least one of the following parameters: a distance between the human eyes and an incident point of a light beam on the screen, a position of a projection of the human eyes on the screen in a horizontal direction of the screen, and a position of the projection of the human eyes on the screen in a vertical direction of the screen.

For example, when the positional parameter includes the distance between the human eyes and an incident point of a light beam on the screen, values of distances between the human eyes and incident points of light beams on the screen in the any two of the M positional parameters are different.

When each positional parameter is a parameter group including a plurality of parameters, that values of any two of the M positional parameters are different may be understood as that values of at least one of parameters included in two positional parameter groups are different.

Optionally, the method further includes: obtaining a third correspondence between N modulation parameters including the first modulation parameter and N screen parameters, where an $n^{th}$ modulation parameter is determined based on a distorted image and a target image that are obtained after the training image is imaged by using a screen having an $n^{th}$ screen parameter, the $n^{th}$ modulation parameter corresponds to the $n^{th}$ screen parameter, values of any two of the N modulation parameters are different, and values of any two of the N screen parameters are different; and the obtaining a first modulation parameter includes: determining a modulation parameter corresponding to a screen parameter of a first screen as the first modulation parameter based on the third correspondence, where the first screen is a screen used for imaging the first image.

Alternatively, the method further includes: obtaining a third correspondence between a plurality of modulation parameters including the first modulation parameter and a plurality of screen parameters, where each modulation parameter is determined based on a distorted image and a target image that are obtained after imaging is performed by using a screen having a screen parameter corresponding to the modulation parameter; and the obtaining a first modulation parameter includes: determining a modulation parameter corresponding to a screen parameter of a first screen as the first modulation parameter based on the third correspondence, where the first screen is a screen used for imaging the first image.

There may be different distortion for screens having different screen parameters. Therefore, this application can be flexibly applied to a scenario in which there are screens having different screen parameters, to further improve the practicability of this application.

Optionally, the screen parameter includes at least one of the following parameters: a screen shape, a screen thickness, a screen material, a screen refractive index, and a screen color.

For example, when the screen parameter includes the screen shape, screen shapes (or index values corresponding to screen shapes) in the any two of the N screen parameters are different.

When each screen parameter is a parameter group including a plurality of parameters, that values of any two of the N screen parameters are different may be understood as that values of at least one of parameters included in two screen parameter groups are different.

Optionally, the optical imaging system is disposed in a vehicle, and the screen includes a windshield of the vehicle.

In addition to a vehicle, the optical imaging system is disposed in a transportation means, for example, a train, an aircraft, or a ship, that includes various apparatuses, for example, a windshield, that can serve as a screen.

In addition, in addition to a windshield, the screen may be an apparatus, for example, a window, having a reflection or refraction function.

Optionally, the first modulation parameter includes a Zernike coefficient.

According to a second aspect, an imaging apparatus is provided, and includes a processor. The processor is coupled to a memory. The memory is configured to store a computer program or instructions. The processor is configured to execute the computer program or the instructions in the memory, so that the processor obtains a first modulation parameter. The first modulation parameter is determined based on a first distorted image and a first target image. The first distorted image is an image presented after a light beam generated after a training image is modulated by a spatial light modulator is reflected by at least one lens and a screen. The first target image is an image of the training image, and distortion of the first target image falls within a preset range. The processor is configured to control the spatial light modulator to modulate an electrical signal of a to-be-imaged first image based on the first modulation parameter.

Specifically, the first distorted image is an image presented after an electrical signal of the training image is modulated based on an original modulation parameter and reflected by the screen.

In the solutions according to this application, the first modulation parameter of the spatial light modulator is determined based on a distorted image and an image expected to be presented, and an electrical signal of a to-be-presented image is modulated based on the first modulation parameter. In this way, while distortion of an image of the to-be-presented image is reduced, a relatively large imaging delay that is caused because compensation processing is performed on the image in an electrical domain can be avoided, and processing costs that are increased because compensation processing is performed on the image in the electrical domain can be reduced.

The screen is disposed off-axis with respect to an optical imaging system (for example, the at least one lens).

There is relatively large distortion when the screen is disposed off-axis with respect to the optical imaging system. Therefore, the solutions according to this application can be applied to a scenario in which the screen is disposed off-axis with respect to the optical imaging system.

In an implementation, the processor is disposed independent of the spatial light modulator in the optical imaging system.

In another implementation, the processor is disposed in the spatial light modulator.

Optionally, the processor is further configured to: control the spatial light modulator to modulate the electrical signal of the training image based on the original modulation parameter, to obtain the first distorted image; adjust the original modulation parameter, so that a deviation between the first distorted image and the first target image falls within the preset range; and determine an adjusted original modulation parameter as the first modulation parameter.

In this way, online processing can be implemented, so that applications in various different environments can be coped with, to improve practicability and reliability.

Optionally, the apparatus further includes a transceiver, configured to: send the training image and an image of the first distorted image to a server; and obtain the first modulation parameter from the server.

A process of determining the first modulation parameter is completed by the third-party server. In this way, a device burden caused by determining the first parameter can be reduced, and an imaging delay caused by determining the first modulation parameter online can be reduced.

Optionally, the processor is further configured to: obtain a first correspondence between a plurality of modulation parameters including the first modulation parameter and a plurality of image parameters, where each modulation parameter is determined based on a distorted image and a target image of a training image having an image parameter corresponding to the modulation parameter; and determine a modulation parameter corresponding to an image parameter of the first image as the first modulation parameter based on the first correspondence.

Alternatively, the processor is further configured to obtain a first correspondence between K modulation parameters including the first modulation parameter and K image parameters. A $k^{th}$ modulation parameter is determined based on a distorted image and a target image of a training image having a $k^{th}$ image parameter, the $k^{th}$ modulation parameter corresponds to the $k^{th}$ image parameter, $K \geq 2$, and $k \in [1, K]$. Values of any two of the K modulation parameters are different, and values of any two of the K image parameters are different.

There may be different distortion for images having different image parameters. Therefore, imaging requirements of images having different image parameters can be flexibly met in this application, to further improve the practicability of this application.

Optionally, the image parameter includes at least one of the following parameters: an image size, an image color, an image shape, and image resolution.

Optionally, the processor is further configured to: obtain a second correspondence between a plurality of modulation parameters including the first modulation parameter and a plurality of positional parameters, where the positional parameter is used to indicate a relative position that is between human eyes and the screen and that exists when an image of an image is observed, each modulation parameter is determined based on a distorted image and a target image of a training image having a positional parameter corresponding to the modulation parameter; and determine a modulation parameter corresponding to a positional parameter of the first image as the first modulation parameter based on the second correspondence.

Alternatively, the processor is further configured to obtain a second correspondence between M modulation parameters including the first modulation parameter and M positional parameters, where the positional parameter is used to indicate a positional relationship between human eyes and the screen, an $m^{th}$ modulation parameter is determined based on a distorted image and a target image of the training image having an $m^{th}$ positional parameter, the $m^{th}$ modulation parameter corresponds to the $m^{th}$ positional parameter, values of any two of the M modulation parameters are different, and values of any two of the M positional parameters are different.

Different distortion may be observed when an image of an image is observed at different positions. Therefore, requirements of images observed at different positions can be flexibly met in this application, to further improve the practicability of this application.

Optionally, the positional parameter includes at least one of the following parameters: a distance between the human eyes and an incident point of a light beam on the screen, a position of a projection of the human eyes on the screen in a horizontal direction of the screen, and a position of the projection of the human eyes on the screen in a vertical direction of the screen.

Optionally, the processor is further configured to: obtain a third correspondence between a plurality of modulation parameters including the first modulation parameter and a plurality of screen parameters, where each modulation parameter is determined based on a distorted image and a target image that are obtained after imaging is performed by using a screen having a screen parameter corresponding to the modulation parameter; and determine a modulation parameter corresponding to a screen parameter of a first screen as the first modulation parameter based on the third correspondence, where the first screen is a screen used for imaging the first image.

Alternatively, the processor is further configured to obtain a third correspondence between N modulation parameters including the first modulation parameter and N screen parameters. An $n^{th}$ modulation parameter is determined based on a distorted image and a target image that are obtained after the training image is imaged by using a screen having an $n^{th}$ screen parameter, and the $n^{th}$ modulation parameter corresponds to the $n^{th}$ screen parameter. Values of any two of the N modulation parameters are different, and values of any two of the N screen parameters are different.

There may be different distortion for screens having different screen parameters. Therefore, this application can be flexibly applied to a scenario in which there are screens having different screen parameters, to further improve the practicability of this application.

Optionally, the screen parameter includes at least one of the following parameters: a screen shape, a screen thickness, a screen material, a screen refractive index, and a screen color.

Optionally, the first modulation parameter includes a Zernike coefficient.

According to a third aspect, an optical imaging system is provided, and includes the processor, the spatial light modulator, and the at least one lens in the second aspect and the implementations of the second aspect.

According to a fourth aspect, an optical imaging system is provided, and includes: a spatial light modulator, configured to modulate an electrical signal of a to-be-imaged first image based on a first modulation parameter to generate an imaging light beam of the first image, where the first modulation parameter is determined based on a first distorted image and a first target image, the first distorted image is an image presented after imaging processing is performed on a training image by using the spatial light modulator and a screen, the first target image is an image of the training image, and distortion of the first target image falls within a preset range; and at least one lens, configured to refract the imaging light beam of the first image.

Optionally, the spatial light modulator is specifically configured to modulate an electrical signal of the training image based on an original modulation parameter, to obtain the first distorted image; the optical imaging system further includes a camera device, configured to capture the first distorted image; and the spatial light modulator is further configured to: obtain the first distorted image from the camera device; adjust the original modulation parameter, so that a deviation between the first distorted image and the first target image falls within the preset range; and determine an adjusted original modulation parameter as the first modulation parameter.

Optionally, the optical imaging system further includes: a camera device, configured to obtain an image of the first distorted image; and a transceiver, configured to: send the image of the first distorted image to a server; and receive the first modulation parameter from the server.

Optionally, the transceiver is further configured to send the training image to the server.

Optionally, the spatial light modulator is configured to: obtain a first correspondence between K modulation parameters including the first modulation parameter and K image parameters, where a $k^{th}$ modulation parameter is determined based on a distorted image and a target image of a training image having a $k^{th}$ image parameter, the $k^{th}$ modulation parameter corresponds to the $k^{th}$ image parameter, $K \geq 2$, $k \in [1, K]$, values of any two of the K modulation parameters are different, and values of any two of the K image parameters are different; and determine a modulation parameter corresponding to an image parameter of the first image as the first modulation parameter based on the first correspondence.

Alternatively, the spatial light modulator is configured to: obtain a first correspondence between a plurality of modulation parameters including the first modulation parameter and a plurality of image parameters, where each modulation parameter is determined based on a distorted image and a target image of a training image having an image parameter corresponding to the modulation parameter; and determine a modulation parameter corresponding to an image parameter of the first image as the first modulation parameter based on the first correspondence.

Optionally, the image parameter includes at least one of the following parameters: an image size, an image color, an image shape, and image resolution.

Optionally, the spatial light modulator is configured to: obtain a second correspondence between a plurality of modulation parameters including the first modulation parameter and a plurality of positional parameters, where the positional parameter is used to indicate a relative position that is between human eyes and the screen and that exists when an image of an image is observed, each modulation parameter is determined based on a distorted image and a target image of a training image having a positional parameter corresponding to the modulation parameter; and determine a modulation parameter corresponding to a positional parameter of the first image as the first modulation parameter based on the second correspondence.

Alternatively, the spatial light modulator is configured to: obtain a second correspondence between M modulation parameters including the first modulation parameter and M positional parameters, where the positional parameter is used to indicate a positional relationship between human eyes and the screen, an $m^{th}$ modulation parameter is determined based on a distorted image and a target image of the training image having an $m^{th}$ positional parameter, the $m^{th}$ modulation parameter corresponds to the $m^{th}$ positional parameter, values of any two of the M modulation parameters are different, and values of any two of the M positional parameters are different; and determine a modulation parameter corresponding to a positional parameter of the first image as the first modulation parameter based on the second correspondence.

Optionally, the positional parameter includes at least one of the following parameters: a distance between the human eyes and an incident point of a light beam on the screen, a position of a projection of the human eyes on the screen in a horizontal direction of the screen, and a position of the projection of the human eyes on the screen in a vertical direction of the screen.

Optionally, the spatial light modulator is configured to: obtain a third correspondence between a plurality of modulation parameters including the first modulation parameter and a plurality of screen parameters, where each modulation parameter is determined based on a distorted image and a target image that are obtained after imaging is performed by using a screen having a screen parameter corresponding to the modulation parameter; and determine a modulation parameter corresponding to a screen parameter of a first screen as the first modulation parameter based on the third correspondence, where the first screen is a screen used for imaging the first image.

Alternatively, the spatial light modulator is configured to: obtain a third correspondence between N modulation parameters including the first modulation parameter and N screen parameters, where an $n^{th}$ modulation parameter is determined based on a distorted image and a target image that are obtained after the training image is imaged by using a screen having an $n^{th}$ screen parameter, the $n^{th}$ modulation parameter corresponds to the $n^{th}$ screen parameter, values of any two of the N modulation parameters are different, and values of any two of the N screen parameters are different; and determine a modulation parameter corresponding to a screen parameter of a first screen as the first modulation parameter based on the third correspondence, where the first screen is a screen used for imaging the first image.

Optionally, the screen parameter includes at least one of the following parameters: a screen shape, a screen thickness, a screen material, a screen refractive index, and a screen color.

Optionally, the first modulation parameter includes a Zernike coefficient.

According to a fifth aspect, a transportation means (for example, a vehicle) is provided, and includes the optical imaging system in the third aspect and the implementations of the third aspect.

According to a sixth aspect, a transportation means (for example, a vehicle) is provided, and includes the optical imaging system in the fourth aspect and the implementations of the fourth aspect.

According to a seventh aspect, a computer program product is provided. The computer program product includes a computer program (which may also be referred to as code or instructions). When the computer program is executed, a computer is enabled to perform the method in any one of the first aspect and the possible implementations of the first aspect.

According to an eighth aspect, a computer-readable medium is provided. The computer-readable medium stores a computer program (which may also be referred to as code or instructions). When the computer program is run on a computer, the computer is enabled to perform the method in any one of the first aspect and the possible implementations of the first aspect.

According to a ninth aspect, a chip system is provided, and includes a memory and a processor. The memory is configured to store a computer program. The processor is configured to: invoke the computer program from the memory, and run the computer program, so that a communications device in which the chip system is installed performs the method in any of the first aspect and the possible implementations of the first aspect.

The chip system may include an input circuit or interface configured to send information or data and an output circuit or interface configured to receive information or data.

DESCRIPTION OF EMBODIMENTS

The following describes technical solutions of this application with reference to accompanying drawings.

The solutions of this application may be applied to an optical imaging system. The optical imaging system may include but is not limited to a heads-up display HUD system or an AR HUD system.

Specifically, a HUD may also be referred to as a windshield instrument display or a heads-up display. That is, important information can be mapped on a holographic half mirror on a windshield by using the optical imaging system, so that a driver can clearly view the important information without lowering a head.

An augmented reality (AR) technology is a technology in which virtual information is skillfully integrated with a real world, a plurality of technical means such as multimedia, three-dimensional modeling, real-time tracking and registration, intelligent interaction, and sensing are widely used, computer-generated virtual information such as text, an image, a three-dimensional model, music, and a video is simulated and then applied to the real world, and the two types of information are complementary to each other, to "enhance" the real world.

An AR HUD may be understood as an integration of the AR technology and a HUD technology, that is, some driving information is properly and vividly superimposed and displayed in a line of sight of a driver, and combined with an actual traffic condition.

Figure 1:
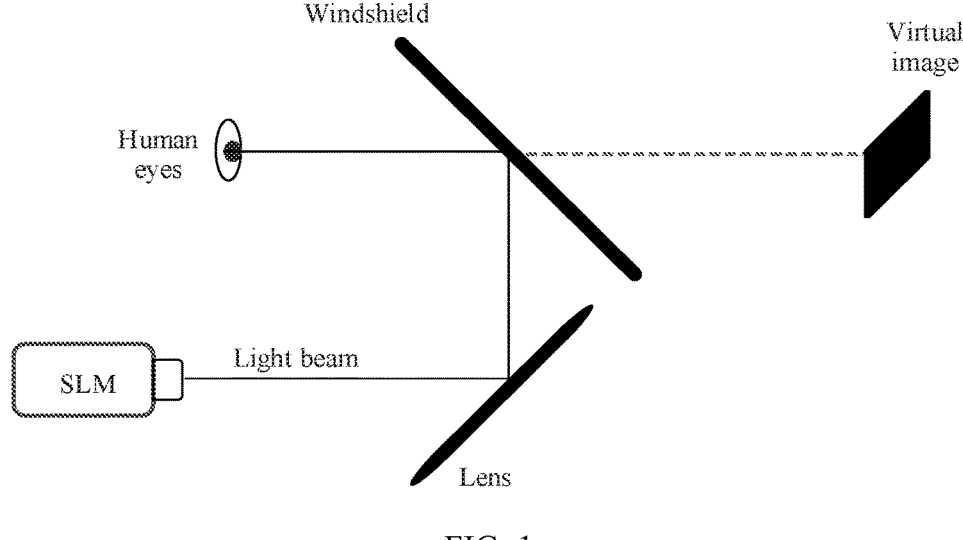
FIG. 1 is a schematic diagram of an example of an imaging process in an AR HUD system.

FIG. 1 is a schematic diagram of an imaging process according to this application. As shown in FIG. 1, a light beam of a to-be-imaged image is emitted from an optical imaging system, and the light beam is reflected (or refracted) by a windshield and is incident to human eyes, so that the human eyes observe an image of the image. For example, when the human eyes and the optical imaging system are located on a same side of the windshield, the image is a virtual image. When the human eyes and the optical imaging system are respectively located on two sides of the windshield, the image is a real image.

Usually, the windshield is disposed off-axis with respect to the optical imaging system (or a lens in the optical imaging system). Therefore, the image of the image observed by the human eyes is distorted.

Figure 2:
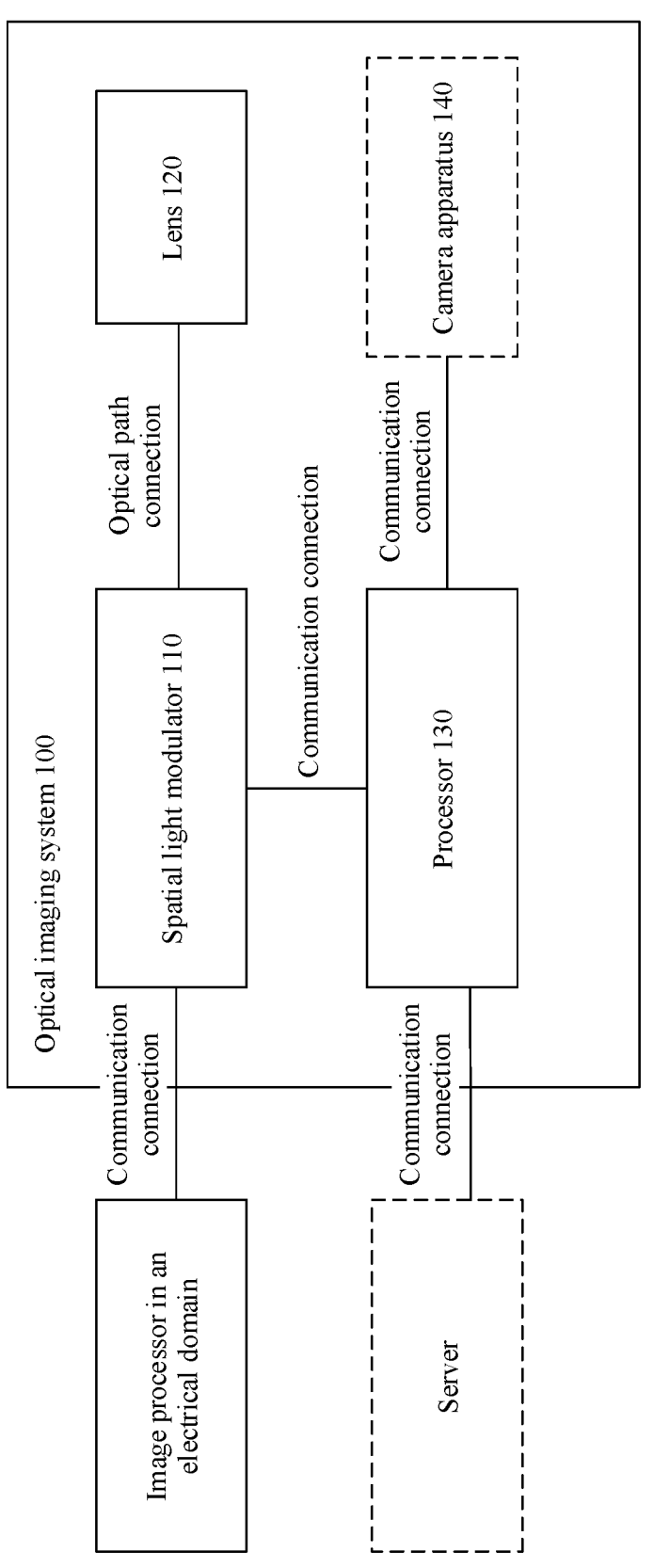
FIG. 2 is a schematic diagram of an optical imaging system according to this application.

FIG. 2 is a schematic diagram of an example of an optical imaging system according to this application. As shown in FIG. 2, the optical imaging system 100 includes:

a spatial light modulator 110;

at least one lens 120; and a processor 130.

The spatial light modulator (SLM) is a device that can load information into a one-dimensional or two-dimensional optical data field, to effectively use an inherent speed, parallelism, and an interconnection capability of light, and can modulate light intensity at each point in two-dimensional space.

Under control of an electrical driving signal or another signal that varies with time, the SLM may change amplitude or intensity, a phase, a polarization state, and a wavelength of light distribution in space, or convert incoherent light into coherent light.

Under active control, the SLM may modulate a parameter of a light field by using a liquid crystal molecule, for example, modulate amplitude of the light field, modulate the phase by using a refractive index, modulate the polarization state through rotation of a plane of polarization, or perform conversion from incoherent light to coherent light, to write specific information into a light wave, to modulate the light wave. The SLM may easily load information into a one-dimensional or two-dimensional light field, and quickly process the loaded information by using advantages such as a wide bandwidth of light and multi-channel parallel processing.

The SLM may include a plurality of independent units. The independent units are spatially arranged into a one-dimensional or two-dimensional array. Each unit can independently receive control of an optical signal or an electrical signal, and change an optical property of the unit based on the signal, to modulate a light wave that illuminates the unit.

In this application, the spatial light modulator 110 may obtain data (or an electrical signal) of a to-be-imaged image from a processing unit in an electrical domain, for example, a graphics processing unit (GPU) or a central processing unit (CPU), and modulate the data onto a light beam, to form a light beam of the image.

The light beam is refracted by the lens 120 and then emitted from the spatial light modulator 110.

In this application, some modulation parameters of the spatial light modulator 110 may be adjusted, to adjust a parameter of an image formed by a light beam emitted from the spatial light modulator 110, for example, a shape or a size of the image.

By way of example but not limitation, the modulation parameter may include but is not limited to a Zernike coefficient or a coefficient in a Zernike polynomial.

Specifically, an aberration refers to an imaging defect in an optical system. In geometrical optics, aberrations (geometrical aberrations) are classified into a monochromatic aberration and a chromatic aberration. The monochromatic aberration includes a spherical aberration, a comatic aberration, astigmatism, field curvature, and distortion. The chromatic aberration includes a chromatic aberration of position and a chromatic aberration of magnification. In physical optics, the aberration is referred to as a wavefront aberration, namely, a distance between a waveform formed after a spherical wave emitted from a point light source passes through the optical system and an ideal spherical wave. The wavefront aberration may be expressed by a Zernike polynomial periodic table or a geometrical aberration such as a spherical aberration or a comatic aberration. The distortion may be understood as a result of different prism image shifts, at surrounding points, caused after a square object passes through the optical system.

An optical primary reflector is a component of a spatial optical remote sensor, and mirror surface precision of the optical primary reflector is one of important factors that affect resolution of the spatial optical remote sensor. In a process of ground installation and adjustment, for the reflector, when an optical axis is in a horizontal state and when the optical axis is in a vertical state, a mirror of the reflector is deformed due to the action of a gravitational field. Therefore, mirror deformation analysis needs to be performed during design of the optical reflector, to check whether the designed optical mirror meets a surface precision requirement. Mirror deformation includes rigid body displacement and surface deformation. Rigid body displacement causes an image in the optical system to be tilted, off-axis, and defocused. Surface deformation affects a wavefront difference of the optical system. Rigid body displacement may be eliminated by adjusting a relative position between optical elements, and surface deformation cannot be eliminated. Therefore, surface deformation in mirror deformation can truly reflect surface precision of the optical reflector. A freeform curved mirror is used as an example. Surface data is obtained through finite element analysis, a deformed surface is precisely fitted by using a Zernike polynomial, a rigid body displacement part is separated to obtain a surface deformation cloud diagram, and a root mean square of surface deformation and a difference between a maximum value and a minimum value of surface deformation are calculated.

It should be understood that the foregoing specific examples of the modulation parameter are merely examples for description, and this application is not limited thereto. All other parameters that can change the shape, the size, or the like of the image formed by the light beam emitted from the spatial light modulator shall fall within the protection scope of this application. For example, the modulation parameter may further include a parameter that is of the spatial light modulator and that is used to control amplitude, intensity, a phase, a polarization state, a wavelength, and the like of the light beam.

Therefore, in this application, the foregoing modulation parameters may be adjusted, to reduce distortion of an image observed by human eyes.

Specifically, the modulation parameter may be a trained parameter that can reduce distortion of the image observed by the human eyes. The processor 130 may obtain the modulation parameter, and control the spatial light modulator 110 to perform light modulation on the to-be-imaged image by using the modulation parameter.

It should be noted that a structure of the optical imaging system 100 shown in FIG. 2 is merely an example for description, and this application is not limited thereto. For example, the processor 130 may be integrated into the spatial light modulator 110, or a function of the processor 130 may be implemented by a device or a module that can implement a computing function in the spatial light modulator 110.

Optionally, the optical imaging system 100 may further include a camera apparatus 140.

The camera apparatus 140 is configured to capture a distorted image. The distorted image is used to determine a modulation parameter. This process is subsequently described in detail.

The camera apparatus 140 is disposed at a position opposite to a position of the human eyes, so that the captured distorted image is the same as or approximately the same as a distorted image observed by the human eyes.

The camera apparatus 140 may be detachable, so that after the distorted image is captured, the camera apparatus 140 may be detached.

The optical imaging system 100 may further include another device included in an optical imaging system in the conventional technology. To avoid repetition, detailed description thereof is omitted herein.

A process of determining (or adjusting) the modulation parameter is described below in detail.

Figure 3:
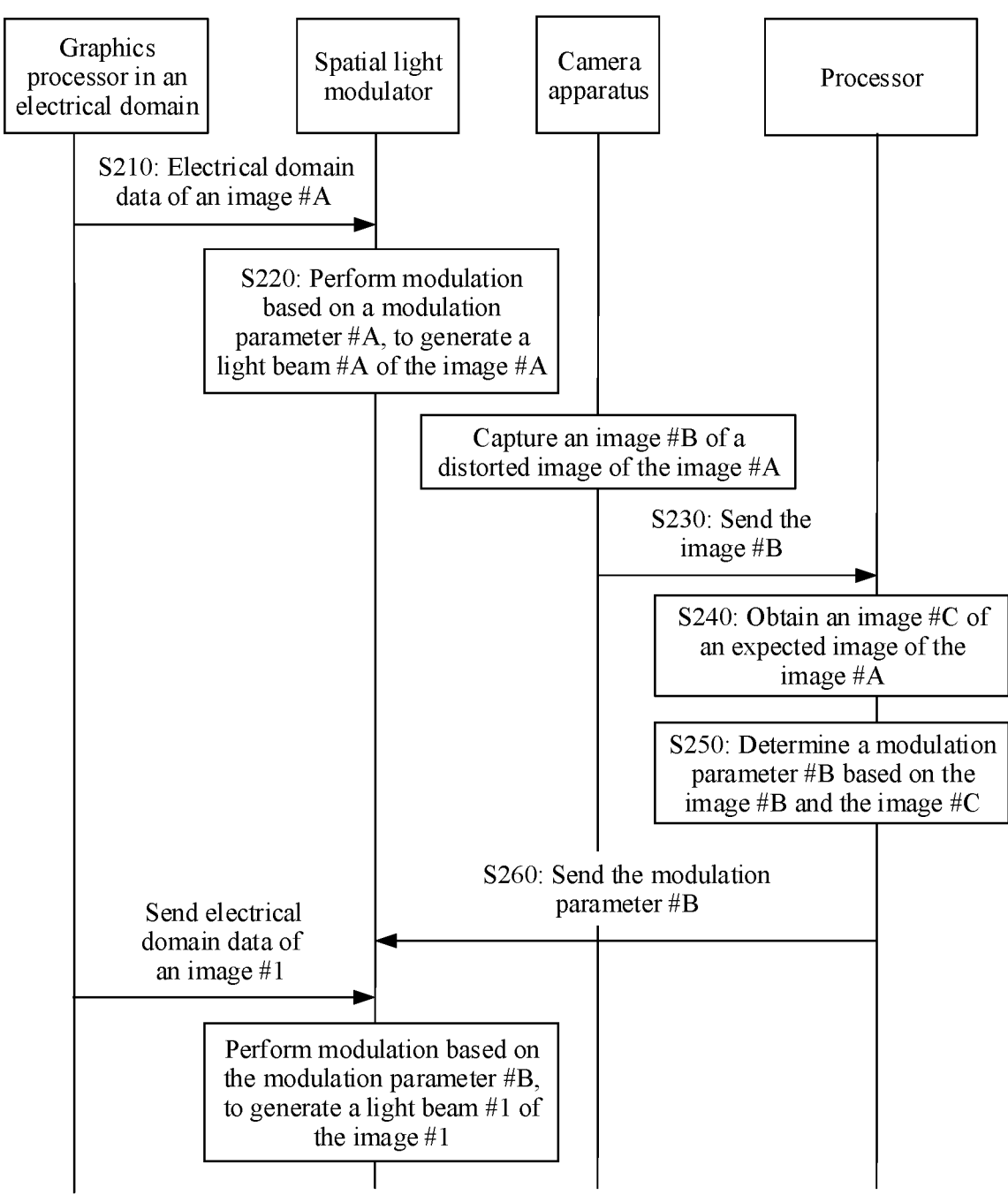
FIG. 3 is a schematic interaction diagram of an example of an imaging method according to this application.

FIG. 3 is a schematic diagram of an example of the process of determining the modulation parameter. As shown in FIG. 3, in S210, the spatial light modulator 110 may obtain electrical domain data (or an electrical domain signal) of an image #A (namely, an example of a training image) from a graphics processor in the electrical domain, for example, the GPU.

In S220, the spatial light modulator 110 may modulate the electrical domain data based on a modulation parameter #A (namely, an example of an original modulation parameter), to generate a light beam of the image #A. For ease of understanding, the light beam is referred to as a light beam #A below.

The modulation parameter #A may be a default parameter or a factory-sett parameter. Alternatively, the modulation parameter #A may be a parameter configured by the processor 130 for the spatial light modulator 110.

The light beam #A is refracted by the lens 120 and reflected (or refracted) by a screen #A, and then is incident to the camera apparatus 140. Therefore, the camera apparatus 140 can capture a distorted image of the image #A, and specifically capture an image of the distorted image. For ease of understanding and differentiation, the image is denoted as an image #B below.

In S230, the processor 130 obtains the image #B from the camera apparatus 140.

In addition, in S240, the processor 130 may determine an expected image of the image #A, and specifically determine an image of the expected image. For ease of understanding and differentiation, the image is denoted as an image #C below. The expected image of the image #A may be understood as an image that is of the image #A, that is observed by the human eyes, and that is not distorted or whose degree of distortion falls within a preset range.

By way of example but not limitation, the processor 130 may obtain the expected image or the image #C of the image #A in the following manner:

Specifically, there are different distortion mapping relationships at different spatial observation positions. Therefore, a limited quantity of different observation positions need to be correspondingly calibrated, and then a distortion mapping relationship at any spatial observation position is generated through interpolation. In addition, it is hoped that a final image observed at any position is in a fixed rectangular field of view in space. Therefore, an appropriate imaging area size needs to be selected for each observation position during calibration.

It is set that the observation positions are calibrated on a same horizontal straight line in the space. At a specific observation position, based on a distorted image corresponding to calibrated lattice of a projection, a size of a maximum rectangular field of view R at the position may be determined by selecting an inscribed rectangle in a distorted lattice. It is assumed that N observation positions are calibrated. At an $i^{th}$ position, for a distorted lattice image (for example, the image #B), a maximum value of a horizontal coordinate in a leftmost column is x_left_i, a minimum value of the horizontal coordinate in a rightmost column is x_right_i, a maximum value of a vertical coordinate in an uppermost row is y_up_i, and a minimum value of the vertical coordinate in a lowermost row is y_down_i. In this case, a rectangular range Ri=[x_left_i, x_right_i, y_up_i, y_down_i] is inscribed in a field of view of the distorted lattice.

Therefore, the rectangular range Ri may be used as the expected image (namely, the image #C) of the image #A.

In addition, there is different distortion at different observation positions, and therefore different ranges Ri in a captured photo (for example, the image #B) correspond to different actual spatial positions. Therefore, a common field of view area in different ranges Ri needs to be found, to correspond to a same spatial range. Ri is a range determined based on distorted lattice images captured at different observation positions. Therefore, to find a common rectangular field of view range in the space, the different ranges Ri need to be moved to a same observation position. Herein, two observation positions i and j are used as an example. There is only horizontal displacement Δx_ij on the same horizontal straight line. Therefore, if the position j is on a right side of the position i, Δx_ij is a positive value. Otherwise, there is a negative value. An observation result Rj_i corresponding to Rj at the observation position i may be calculated by using a pinhole imaging model. A specific calculation formula is as follows:

$$Rj\_i=[x\_left\_j+f/Z^*\Delta x\_ij^*ppi,x\_right\_j+f/ \\ Z^*\Delta x^*\_ij^*ppi,y\_up\_j,y\_down\_j].$$

Herein, f is a focal length of a camera, Z is a distance between an imaging plane and the camera, and ppi is a quantity of pixels per unit distance on a CCD plane of the camera.

A common rectangular field of view area selected at the position i is $$R^*=[max\{x\_left\_i,x\_left\_j+f/Z^*\Delta x\_ij^*ppi\}, \\ min\{x\_right\_i,x\_right\_j+f/Z^*\Delta x\_ij^*ppi\}, \\ max\{y\_up\_i,y\_up\_j\},min(y\_down\_i,y\_down\_j)].$$

When there are more than two observation positions, an operation is similar to that described above, and it is only required that all the observation positions are moved to a same observation position, and a common area is selected, to obtain R*.

After R* is obtained, a rectangular field of view range R*_j at any observation position j may be restored by using the pinhole imaging model:

$R*\_j=[\max\{x\_left\_i,x\_left\_j+f/Z*\Delta x\_ij*ppi\}-f/$
$Z*\Delta x\_ij*ppi,\min\{x\_right\_i,x\_right\_j+f/$
$Z*\Delta x\_ij*ppi\}-f/Z*\Delta x\_ij*ppi,\max\{y\_up\_i,$
$y\_up\_j\},\min(y\_down\_i,y\_down\_j)].$ After mapping relationships at a plurality of observation points on a straight line are calibrated, the distortion mapping relationship at any position is obtained through interpolation:

For any spatial observation point k, an interval of a calibrated observation point in which a projection of the observation position is located is first obtained. A distortion mapping table P_k at the position k is generated by performing linear interpolation by using distortion mapping tables at two most adjacent calibrated observation points. An interpolation formula is as follows:

$P\_k=(1-\alpha)*P\_i+\alpha*P\_i+1.$

Herein, $\alpha=d1/d1+d2$, and P_i and P_i+1 are respectively the distortion mapping relationship tables at the two adjacent calibrated positions.

In S250, the processor 130 may perform training based on the image #B and the image #C, to obtain a modulation parameter #B.

For example, the processor 130 may determine whether a similarity between the image #B and the image #C meets a preset condition, for example, whether a deviation between positions of pixels at a same position in the image #B and the image #C is less than or equal to a preset deviation value.

If it is determined that the deviation is less than or equal to the preset deviation value, the modulation parameter #A may be determined as the modulation parameter #B.

If it is determined that the deviation is not less than or equal to the preset deviation value, the following operations may be performed:

In step a, the processor 130 may perform adjustment based on the modulation parameter #A, a specified adjustment direction, and a specified adjustment step, to obtain a modulation parameter #C.

In step b, the spatial light modulator 110 may modulate the electrical domain data of the image #A based on the modulation parameter #C, to generate a light beam of the image #A. For ease of understanding, the light beam is referred to as a light beam #B below.

In step c, the light beam #B is refracted by the lens 120 and reflected (or refracted) by the screen, and then is incident to the camera apparatus 140. Therefore, the camera apparatus 140 can capture a distorted image of the image #A, and specifically capture an image of the distorted image. For ease of understanding and differentiation, the image is denoted as an image #D below.

In step d, the processor 130 obtains the image #D from the camera apparatus 140.

In step e, the processor 130 may determine whether a similarity between the image #D and the image #C meets the preset condition, for example, whether a deviation between positions of pixels at a same position in the image #D and the image #C is less than or equal to the preset deviation value.

If it is determined that the deviation is less than or equal to the preset deviation value, the modulation parameter #C may be determined as the modulation parameter #B.

If it is determined that the deviation is not less than or equal to the preset deviation value, step a to step e are repeated until a similarity between an image (which is denoted as an image #X) of a distorted image formed by a light beam generated based on an adjusted modulation parameter (which is denoted as a modulation parameter #X)

and the image #C meets the preset condition. Therefore, the modulation parameter #X may be determined as the modulation parameter #B.

It should be understood that the listed process of obtaining the modulation parameter #B by performing training based on the image #B and the image #C is merely an example for description, and this application is not limited thereto. For example, the image #B and the image #C may be used as input data of a neural network model, and output data of the neural network model may be the modulation parameter #B.

A process of training the neural network model is described below in detail.

For ease of understanding, related terms and related concepts such as a neural network in the embodiments of this application are first described below.

1. Neural Network

The neural network may include a neural unit. The neural unit may refer to an operation unit whose inputs are $x_s$ and an intercept 1. An output of the operation unit may be as follows:

$$h_{W,b}(x) = f(W^T x) = f\left(\sum_{s=1}^{n} W_s x_s + b\right).$$

Herein, $s=1, 2, \ldots$, and n, n is a natural number greater than 1, $W_s$ is a weight of $x_s$, b is an offset of the neural unit, and f is an activation function of the neural unit, and is used to introduce a nonlinear characteristic into the neural network to convert an input signal in the neural unit into an output signal. An output signal of the activation function may be used as an input of a next layer, namely, a convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

2. Convolutional Neural Network

The convolutional neural network is a deep neural network with a convolutional structure. The convolutional neural network includes a feature extractor including a convolutional layer and a subsampling layer. The feature extractor may be considered as a filter. A convolution process may be considered as using a trainable filter to perform convolution on an input image or a convolutional feature map. The convolutional layer is a neuron layer that is in the convolutional neural network and at which convolution processing is performed on an input signal. At the convolutional layer in the convolutional neural network, a neuron may be connected to only some adjacent neuron layers. The convolutional layer usually includes several feature maps, and each feature map may include some neural units arranged in a rectangle. Neural units on a same feature map share a weight. The shared weight herein is a convolution kernel. The shared weight may be understood as that a manner of extracting image information is independent of a position. An underlying principle is that statistical information of a part of an image is the same as that of another part. This means that image information obtained through learning in one part can also be used in another part. Therefore, the same image information obtained through learning can be used for all positions on the image. At a same convolutional layer, a plurality of convolution kernels may be used to extract different image information. Usually, a larger quantity of convolution kernels indicates richer image information reflected by a convolution operation.

The convolution kernel may be initialized in a form of a matrix of a random size, and in a process of training the convolutional neural network, the convolution kernel may obtain a proper weight through learning. In addition, direct benefits of sharing a weight are that connections between layers in the convolutional neural network are reduced, and a risk of overfitting is reduced.

3. Back Propagation Algorithm

The convolutional neural network may correct a value of a parameter in an initial super-resolution model in a training process according to an error back propagation (BP) algorithm, so that an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, for example, a weight matrix, of an optimal super-resolution model.

The process of training the neural network model is described below.

Figure 4:
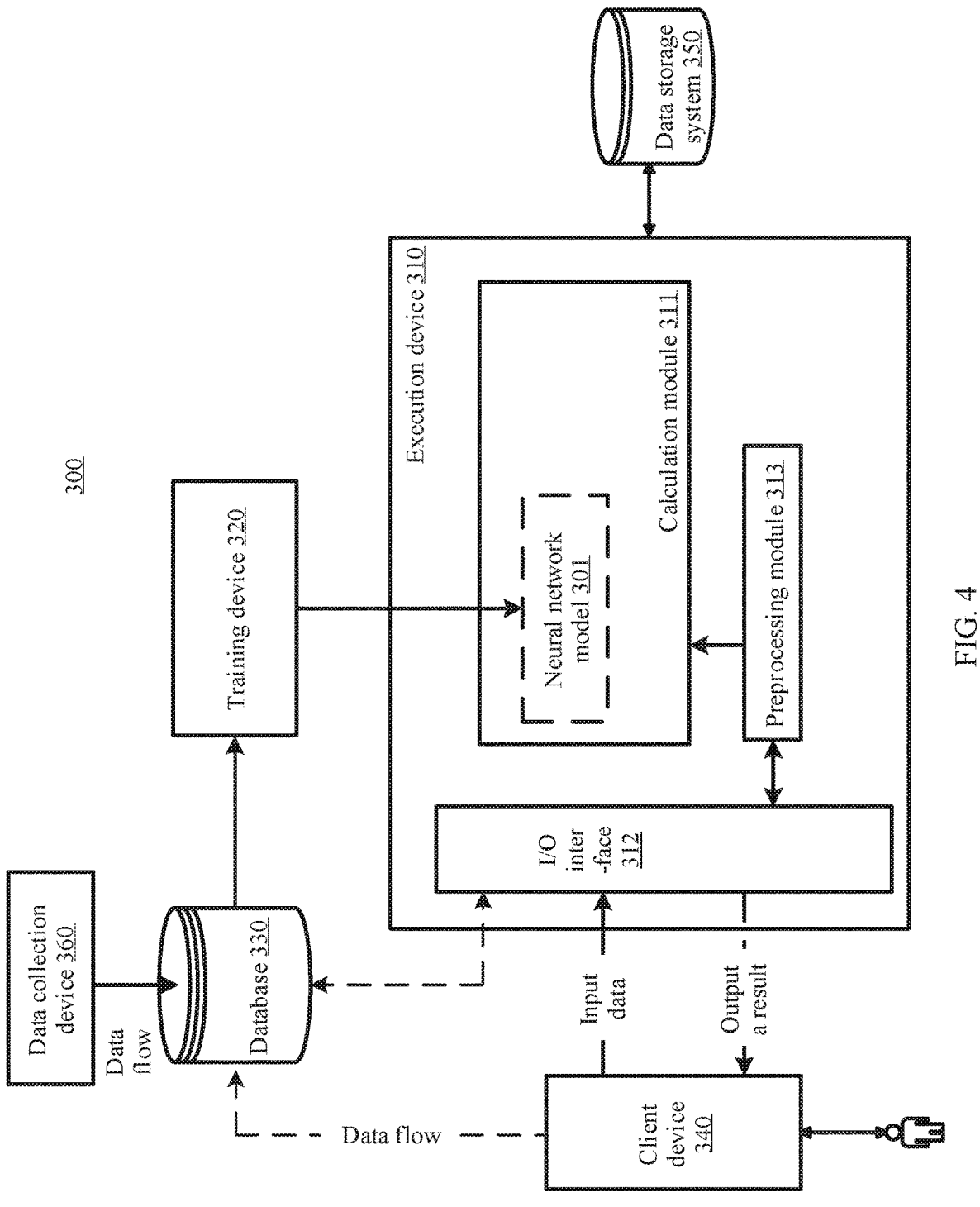
FIG. 4 is a diagram of a structure of an example of a neural network device according to this application.

A system architecture for training the neural network model provided in an embodiment of this application is first described. Referring to FIG. 4, an embodiment of this application provides a system architecture 300. As shown in the system architecture 300, a data collection device 360 (for example, the camera apparatus 140 and the processor 130) is configured to collect training data. A process of obtaining the training data may be similar to the process of obtaining the image #C and the image #B. Alternatively, the image #C and the image #B may be used as training data.

In addition, the data collection device 360 stores the training data in a database 330, and a training device 320 obtains a neural network model 301, namely, a neural network model 301 corresponding to the modulation parameter #B, through training based on training data maintained in the database 330.

It should be noted that in actual application, not all the training data maintained in the database 330 is necessarily collected by the data collection device 360, and the training data may be received from another device. It should be further noted that the training device 320 may not train the neural network model 301 based only on the training data maintained in the database 330, and may obtain training data from a cloud or another place to perform model training. The foregoing description should not be used as a limitation on the embodiments of this application.

The neural network model 301 obtained based on training by the training device 320 may be applied to an execution device 310.

In FIG. 4, an I/O interface 312 is configured for the execution device 310, and is configured to exchange data with a client device 340 (for example, the processor 130 or the spatial light modulator 110). The client device 340 inputs data (for example, the image #C and the image #B) to the I/O interface 312.

A preprocessing module 313 is configured to perform preprocessing based on the input data received by the I/O interface 312. A preprocessing process and method may be similar to those in the conventional technology. To avoid repetition, detailed description of the process and the method is omitted herein. It should be noted that in this application, the input data may not be preprocessed. In this case, the system architecture 300 may not include the preprocessing module 313.

A calculation module 311 is configured to perform related processing such as calculation on the input data from the preprocessing module 313 or the I/O interface 312 based on the neural network model 301.

It should be noted that the execution device 310 may invoke data, code, and the like in a data storage system 350 to perform corresponding processing, and may further store, in the data storage system 350, data, instructions, and the like obtained by performing corresponding processing.

Finally, the I/O interface 312 returns a processing result, for example, the obtained modulation parameter #B, to the client device 340.

In the case shown in FIG. 4, a user may manually provide input data. The input data may be manually provided by performing an operation through an interface provided by the I/O interface 312. In another case, the client device 340 may automatically send the input data to the I/O interface 312. If the client device 340 is required to automatically send the input data, authorization from the user needs to be obtained, and the user may set corresponding permission in the client device 340. The user may view, on the client device 340, a result output by the execution device 310. A specific form of presentation may be a specific form such as a display, a sound, or an action. The client device 340 may also be used as a data collection terminal, to collect the input data that is input to the I/O interface 312 and that is shown in FIG. 4 and the output result output from the I/O interface 312, use the input data and the output result as new sample data, and store the new sample data in the database 330. Certainly, the client device 340 may not perform collection, and the I/O interface 312 directly uses the input data that is input to the I/O interface 312 and that is shown in FIG. 4 and the output result output from the I/O interface 312 as new sample data, and stores the new sample data in the database 330.

It should be noted that FIG. 4 is merely a schematic diagram of a system architecture according to an embodiment of this application, and a positional relationship between devices, components, modules, and the like shown in the figure does not constitute any limitation. For example, in FIG. 4, the data storage system 350 is an external memory with respect to the execution device 310. In another case, the data storage system 350 may be disposed in the execution device 310.

The neural network in this application may include but is not limited to a convolutional neural network CNN. The convolutional neural network is a deep neural network with a convolutional structure, and is a deep learning architecture. The deep learning architecture means that learning at a plurality of levels is performed at different abstraction levels by using a machine learning algorithm. As a deep learning architecture, the CNN is a feed-forward artificial neural network, and each neuron in the feed-forward artificial neural network can respond to an image input to the network.

Figure 5:
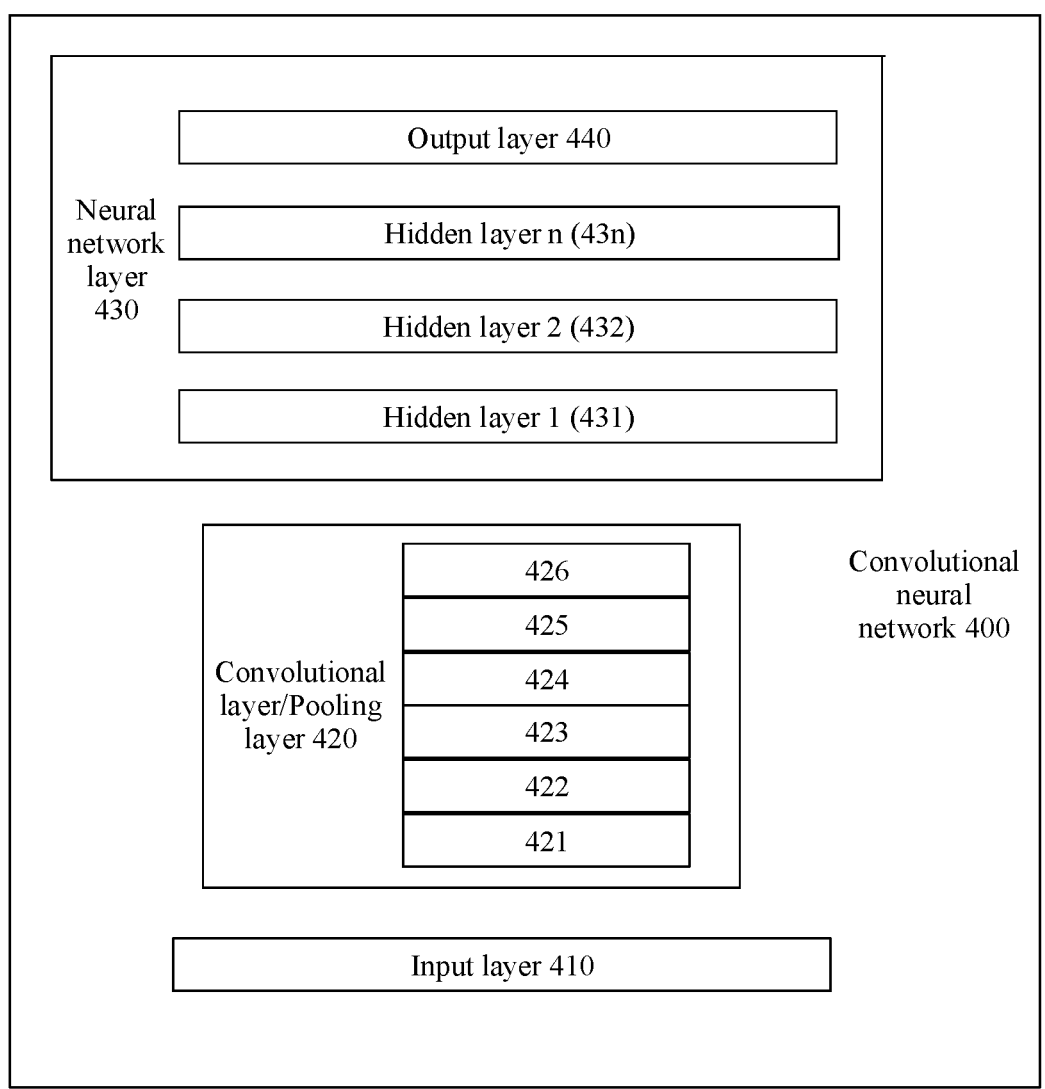
FIG. 5 is a schematic diagram of an example of a hierarchy of a neural network according to this application.

As shown in FIG. 5, a convolutional neural network (CNN) 400 may include an input layer 410, a convolutional layer/pooling layer 420 (the pooling layer is optional), and a neural network layer 430.

Convolutional Layer/Pooling Layer 420:

Convolutional Layer:

As shown in FIG. 5, the convolutional layer/pooling layer 420 may include, for example, layers 421-426. For example, in an implementation, the layer 421 is a convolutional layer, the layer 422 is a pooling layer, the layer 423 is a convolutional layer, the layer 424 is a pooling layer, the layer 425 is a convolutional layer, and the layer 426 is a pooling layer. In another implementation, 421 and 422 are convolutional layers, 423 is a pooling layer, 424 and 425 are convolutional layers, and 426 is a pooling layer. That is, an output of a convolutional layer may be used as an input to a subsequent pooling layer, or may be used as an input to another convolutional layer to continue a convolution operation.

An internal working principle of a convolutional layer is described below by using the convolutional layer 421 as an example.

The convolutional layer 421 may include a plurality of convolution operators. The convolution operator is also referred to as a kernel, and a function of the convolution operator in image processing is equivalent to a filter for extracting specific information from an input image matrix. The convolution operator may be essentially a weight matrix, and the weight matrix is usually predefined. In a process of performing a convolution operation on an image, the weight matrix usually performs processing one pixel by one pixel (or two pixels by two pixels, which depends on a value of a step (stride)) on an input image in a horizontal direction, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolution output of a single depth dimension is generated when convolution is performed with a single weight matrix. However, in most cases, the single weight matrix is not used, but a plurality of weight matrices of a same size (rows×columns), namely, a plurality of homotype matrices, are used. Outputs of the weight matrices are stacked to form a depth dimension of a convolutional image. The dimension herein may be understood as being determined based on the foregoing "plurality". Different weight matrices may be used to extract different features in an image. For example, a weight matrix is used to extract image edge information, another weight matrix is used to extract a specific color of the image, and another weight matrix is used to blur unnecessary noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a large amount of training in actual application, and each weight matrix including the weight values obtained through training may be used to extract information from the input image, so that the convolutional neural network 400 makes a correct prediction.

When the convolutional neural network 400 has a plurality of convolutional layers, a relatively large quantity of general features are usually extracted at an initial convolutional layer (for example, 421). The general feature may also be referred to as a low-level feature. As a depth of the convolutional neural network 400 increases, a feature extracted at a subsequent convolutional layer (for example, 426) is more complex, for example, a high-level semantic feature. A feature with higher-level semantics is more applicable to a to-be-resolved problem.

Pooling Layer:

A quantity of training parameters usually needs to be reduced, and therefore the pooling layer usually needs to be periodically introduced after the convolutional layer. For the layers 421-426 shown as examples of 420 in FIG. 5, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may calculate pixel values in an image within a specific range, to generate an average value as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 430:

After processing is performed by the convolutional layer/pooling layer 420, the convolutional neural network 400 cannot output required output information. As described above, the convolutional layer/pooling layer 420 extracts only a feature, and reduces parameters brought by an input image. However, to generate the final output information (required class information or other related information), the convolutional neural network 400 needs to use the neural network layer 430 to generate one or a group of outputs of a quantity of required classes. Therefore, the neural network layer 430 may include a plurality of hidden layers (for example, 431 and 432 to 43$n$ shown in FIG. 5) and an output layer 440. Parameters included at the plurality of hidden layers may be obtained by performing pre-training based on related training data of a specific task type. For example, the task type may include image recognition, image classification, and image super-resolution reconstruction.

After the plurality of hidden layers at the neural network layer 430, a last layer in the entire convolutional neural network 400 is the output layer 440. The output layer 440 has a loss function similar to cross-entropy for classification, and is specifically configured to calculate and predict an error. Once forward propagation (for example, propagation in a direction from 410 to 440 is forward propagation in FIG. 5) of the entire convolutional neural network 400 is completed, back propagation (for example, propagation in a direction from 440 to 410 is back propagation in FIG. 5) is started, to update the weight value and a deviation at each layer, to reduce a loss of the convolutional neural network 400 and an error between a result output by the convolutional neural network 400 through the output layer and an ideal result.

It should be noted that the convolutional neural network 400 shown in FIG. 5 is merely an example of a convolutional neural network. In specific application, the convolutional neural network may alternatively exist in a form of another network model.

In S260, the processor 130 may set a modulation parameter used by the spatial light modulator 110 as the modulation parameter #B.

Therefore, when the spatial light modulator 110 may obtain electrical domain data (or an electrical domain signal) of a new image (namely, an example of a first image, which is denoted as an image #1) from the graphics processor in the electrical domain, for example, the GPU, the spatial light modulator 110 may modulate the electrical domain data based on the modulation parameter #B (namely, an example of a first modulation parameter), to generate a light beam of the image #1. For ease of understanding, the light beam is referred to as a light beam #1 below.

The modulation parameter #B is obtained through training, and can compensate for distortion. Therefore, distortion of an image that is observed by the human eyes and that is obtained after the light beam #1 is refracted by the lens 120 and reflected by the screen #A can be reduced.

It should be understood that the listed process of processing the image 1 is merely an example for description, and this application is not limited thereto. For example, one or more of the following manners may be used.

Manner a

Specifically, the processor 130 may further store a mapping relationship between an image parameter (which is denoted as an image parameter #A) of the image #A and the modulation parameter #B.

Alternatively, when the modulation parameter #B is obtained through training based on a plurality of training images, image parameters of the plurality of training images may be the same, and therefore the processor 130 may further include a mapping relationship between the same image parameter (for example, the image parameter #A) and the modulation parameter #B.

Similarly, a plurality of modulation parameters may be respectively obtained through training based on training images (specifically, distorted images and expected images of the training images) having different image parameters. This process is similar to the process of determining the modulation parameter #B. To avoid repetition, detailed description of this process is omitted herein.

By way of example but not limitation, the image parameter may include but is not limited to one or more of the following parameters:

an image size, an image color, an image shape, and image resolution.

Therefore, the processor 130 may generate a one-to-one correspondence between the plurality of image parameters and the plurality of modulation parameters. The correspondence is denoted as a correspondence #A (namely, an example of a first correspondence). An example of the correspondence is shown in Table 1.

TABLE 1

| Image parameter #A | Modulation parameter #B |
|---|---|
| . . . | . . . |
| Image parameter #M | Modulation parameter #N |

Therefore, the processor 130 may determine a modulation parameter (which is denoted as a modulation parameter #1) corresponding to an image parameter (which is denoted as an image parameter #1) from the correspondence #A based on the image parameter #1 of the image #1, and the processor 130 may set the modulation parameter used by the spatial light modulator 110 as the modulation parameter #1.

Further, the spatial light modulator 110 may modulate the electrical domain data based on the modulation parameter #1 (namely, an example of the first modulation parameter), to generate a light beam of the image #1.

Manner b

Specifically, the processor 130 may further store a mapping relationship between a positional parameter (which is denoted as a positional parameter #A) of the image #A and the modulation parameter #B.

A positional parameter of an image may be understood as a parameter of a position that is of the human eyes with respect to the screen and that exists when the human eyes observe an image of the image.

Alternatively, when the modulation parameter #B is obtained through training based on a plurality of training images, positional parameters of the plurality of training images may be the same, and therefore the processor 130 may further include a mapping relationship between the same positional parameter (for example, a positional parameter #A) and the modulation parameter #B.

Similarly, a plurality of modulation parameters may be respectively obtained through training based on training images (specifically, distorted images and expected images of the training images) having different positional parameters. This process is similar to the process of determining the modulation parameter #B. To avoid repetition, detailed description of this process is omitted herein.

By way of example but not limitation, the positional parameter may include but is not limited to one or more of the following parameters:

a distance between the human eyes and the screen, a position of the human eyes in a horizontal direction of the screen, and a position of the human eyes in a vertical direction of the screen.

Therefore, the processor 130 may generate a one-to-one correspondence between the plurality of positional parameters and the plurality of modulation parameters. The correspondence is denoted as a correspondence #B (namely, an example of a second correspondence). An example of the correspondence is shown in Table 2.

TABLE 2

| Positional parameter #A | Modulation parameter #B |
|---|---|
| . . . | . . . |
| Positional parameter #M | Modulation parameter #N |

Therefore, the processor 130 may determine a modulation parameter (which is denoted as a modulation parameter #2) corresponding to a positional parameter (namely, a positional parameter that exists when the human eyes observe the image #1, which is denoted as a positional parameter #1) from the correspondence #B based on the positional parameter #1 of the image #1, and the processor 130 may set the modulation parameter used by the spatial light modulator 110 as the modulation parameter #2.

Further, the spatial light modulator 110 may modulate the electrical domain data based on the modulation parameter #2 (namely, an example of the first modulation parameter), to generate a light beam of the image #1.

It should be understood that the listed manners a and b may be used alone or in combination with each other.

For example, specifically, the processor 130 may respectively obtain a plurality of modulation parameters through training based on training images (specifically, distorted images and expected images of the training images) having different parameter groups.

Each parameter group includes a positional parameter and an image parameter.

Further, the processor 130 may generate a one-to-one correspondence between the plurality of parameter groups and the plurality of modulation parameters. The correspondence is denoted as a correspondence. An example of the correspondence is shown in Table 3.

TABLE 3

| Image parameter #A | Positional parameter #A | Modulation parameter #B |
|---|---|---|
| . . . | . . . | . . . |
| Image parameter #M | Positional parameter #M | Modulation parameter #N |

Therefore, the processor 130 may determine a modulation parameter (which is denoted as a modulation parameter #3) corresponding to a parameter group of the image #1 (namely, a positional parameter and an image parameter of the image 1) from the correspondence based on the parameter group of the image #1, and the processor 130 may set the modulation parameter used by the spatial light modulator 110 as the modulation parameter #3.

Further, the spatial light modulator 110 may modulate the electrical domain data based on the modulation parameter #3 (namely, an example of the first modulation parameter), to generate a light beam of the image #1.

Manner c

Specifically, the processor 130 may further store a mapping relationship between a screen parameter (which is denoted as a screen parameter #A) of the image #A and the modulation parameter #B.

A screen parameter of an image may be understood as a parameter of a screen used for imaging the image.

Alternatively, when the modulation parameter #B is obtained through training based on a plurality of training images, screen parameters of the plurality of training images may be the same, and therefore the processor 130 may further include a mapping relationship between the same screen parameter (for example, the screen parameter #A) and the modulation parameter #B.

Similarly, a plurality of modulation parameters may be respectively obtained through training based on training images (specifically, distorted images and expected images of the training images) having different screen parameters. This process is similar to the process of determining the modulation parameter #B. To avoid repetition, detailed description of this process is omitted herein.

By way of example but not limitation, the screen parameter may include but is not limited to one or more of the following parameters:

a screen shape, a screen thickness, a screen material, a screen refractive index, and a screen color.

Therefore, the processor 130 may generate a one-to-one correspondence between the plurality of screen parameters and the plurality of modulation parameters. The correspondence is denoted as a correspondence #C (namely, an example of a third correspondence). An example of the correspondence is shown in Table 4.

TABLE 4

| Screen parameter #A | Modulation parameter #B |
|---|---|
| . . . | . . . |
| Screen parameter #M | Modulation parameter #N |

Therefore, the processor 130 may determine a modulation parameter (which is denoted as a modulation parameter #4) corresponding to a screen parameter (namely, a positional parameter of a screen used for imaging the image #1, which is denoted as a screen parameter #1) from the correspondence #C based on the screen parameter #1 of the image #1, and the processor 130 may set the modulation parameter used by the spatial light modulator 110 as the modulation parameter #4.

Further, the spatial light modulator 110 may modulate the electrical domain data based on the modulation parameter #4 (namely, an example of the first modulation parameter), to generate a light beam of the image #1.

It should be understood that the listed manners a and c may be used alone or in combination with each other, the listed manners b and c may be used alone or in combination with each other, or the listed manners a, b, and c may be used in combination with each other.

For example, the processor 130 may respectively obtain a plurality of modulation parameters through training based on training images (specifically, distorted images and expected images of the training images) having different parameter groups.

Each parameter group includes an image parameter and a screen parameter.

Further, the processor 130 may generate a one-to-one correspondence between the plurality of parameter groups and the plurality of modulation parameters. The correspondence is denoted as a correspondence. An example of the correspondence is shown in Table 5.

TABLE 5

| Image parameter #A | Screen parameter #A | Modulation parameter #B |
|---|---|---|
| . . . | . . . | . . . |
| Image parameter #M | Screen parameter #M | Modulation parameter #N |

Therefore, the processor 130 may determine a modulation parameter (which is denoted as a modulation parameter #5) corresponding to a parameter group of the image #1 (namely, an image parameter and a screen parameter of the image 1) from the correspondence based on the parameter group of the image #1, and the processor 130 may set the modulation parameter used by the spatial light modulator 110 as the modulation parameter #5.

Further, the spatial light modulator 110 may modulate the electrical domain data based on the modulation parameter #5 (namely, an example of the first modulation parameter), to generate a light beam of the image #1.

For another example, the processor 130 may respectively obtain a plurality of modulation parameters through training based on training images (specifically, distorted images and expected images of the training images) having different parameter groups.

Each parameter group includes a positional parameter and a screen parameter.

Further, the processor 130 may generate a one-to-one correspondence between the plurality of parameter groups and the plurality of modulation parameters. The correspondence is denoted as a correspondence. An example of the correspondence is shown in Table 6.

TABLE 6

| Positional parameter #A | Screen parameter #A | Modulation parameter #B |
|---|---|---|
| . . . | . . . | . . . |
| Positional parameter #M | Screen parameter #M | Modulation parameter #N |

Therefore, the processor 130 may determine a modulation parameter (which is denoted as a modulation parameter #6) corresponding to a parameter group of the image #1 (namely, a positional parameter and a screen parameter of the image 1) from the correspondence based on the parameter group of the image #1, and the processor 130 may set the modulation parameter used by the spatial light modulator 110 as the modulation parameter #6.

Further, the spatial light modulator 110 may modulate the electrical domain data based on the modulation parameter #6 (namely, an example of the first modulation parameter), to generate a light beam of the image #1.

For another example, the processor 130 may respectively obtain a plurality of modulation parameters through training based on training images (specifically, distorted images and expected images of the training images) having different parameter groups.

Each parameter group includes a positional parameter, an image parameter, and a screen parameter.

Further, the processor 130 may generate a one-to-one correspondence between the plurality of parameter groups and the plurality of modulation parameters. The correspondence is denoted as a correspondence. An example of the correspondence is shown in Table 7.

TABLE 7

| Image parameter #A | Positional parameter #A | Screen parameter #A | Modulation parameter #B |
|---|---|---|---|
| . . . | . . . | . . . | . . . |
| Image parameter #M | Positional parameter #M | Screen parameter #M | Modulation parameter #N |

Therefore, the processor 130 may determine a modulation parameter (which is denoted as a modulation parameter #7) corresponding to a parameter group of the image #1 (namely, an image parameter, a positional parameter, and a screen parameter of the image 1) from the correspondence based on the parameter group of the image #1, and the processor 130 may set the modulation parameter used by the spatial light modulator 110 as the modulation parameter #7.

Further, the spatial light modulator 110 may modulate the electrical domain data based on the modulation parameter #7 (namely, an example of the first modulation parameter), to generate a light beam of the image #1.

Figure 6:
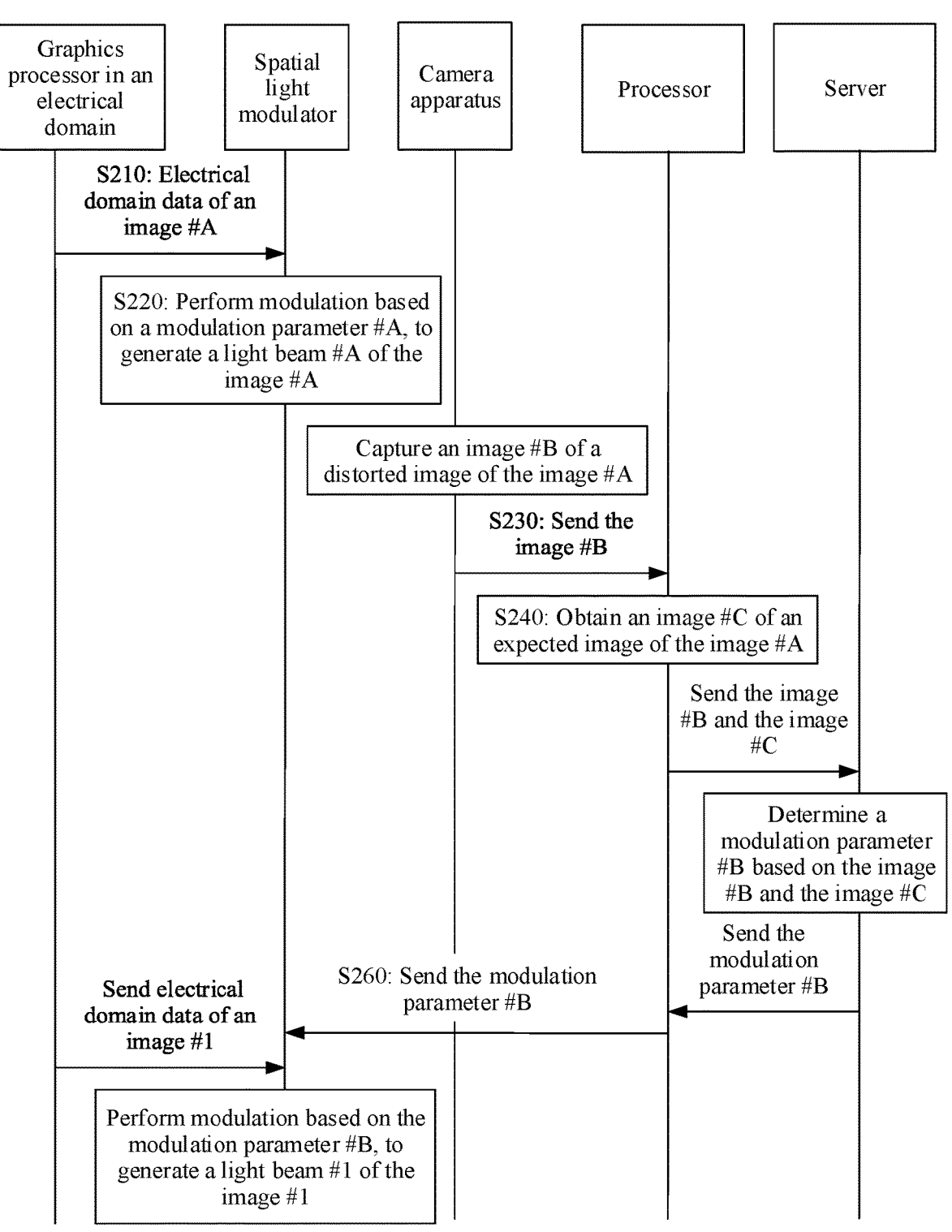
FIG. 6 is a schematic interaction diagram of another example of an imaging method according to this application.

FIG. 6 is a schematic diagram of an example of the process of determining the modulation parameter. A difference from the process shown in FIG. 3 is that the processor 130 may send the training data to a server after obtaining the training data.

The training data may include a distorted image and an expected image of one or more training images, for example, the image #B and the image #C.

Alternatively, the training data may include a distorted image of the training image. In this case, the server may determine an expected image of the training image based on the distorted image of the training image.

Therefore, the server may obtain (or determine) one or more modulation parameters (for example, the modulation parameter #B) through training based on the training data. In addition, this training process may be similar to the process performed by the processor 130 in the method 200. To avoid repetition, detailed description of the training process is omitted herein.

Subsequently, the server sends the modulation parameter obtained through training to the processor 130.

Therefore, when processing the image #1, the processor 130 may determine, based on the modulation parameter fed back by the server, a modulation parameter that needs to be used by the spatial light modulator 110.

It should be understood that the listed solutions in which the processor 130 obtains the modulation parameter are merely examples for description. The training process may be preconfigured in the processor 130 (or a memory that can be accessed by the processor 130) through an experiment, training, or the like before delivery, and the training process may be similar to the process performed by the processor 130 in the method 200. To avoid repetition, detailed description of the training process is omitted herein.

Figure 7:
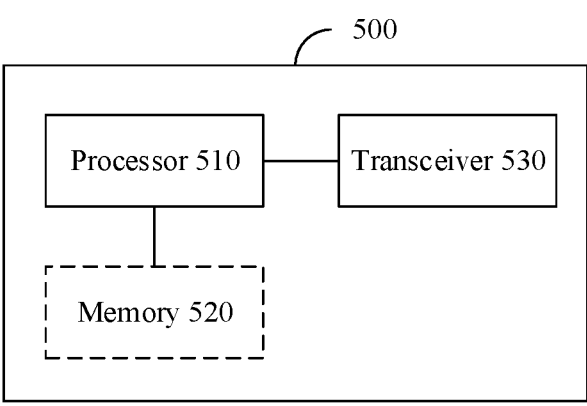
FIG. 7 is a schematic diagram of an example of an imaging apparatus according to this application.

As shown in FIG. 7, an embodiment of this application further provides an imaging apparatus 500. The imaging apparatus 500 includes a processor 510. The processor 510 is coupled to a memory 520. The memory 520 is configured to store a computer program or instructions and/or data. The processor 510 is configured to execute the computer program or the instructions and/or the data stored in the memory 520, so that the method in the foregoing method (specifically, the method performed by the processor 130) embodiments is performed.

Optionally, the imaging apparatus 500 includes one or more processors 510.

Optionally, as shown in FIG. 7, the imaging apparatus 500 may further include the memory 520. Specifically, there may be one or more memories 520. Optionally, the memory 520 and the processor 510 may be integrated or disposed separately.

As shown in FIG. 7, the imaging apparatus 500 may further include a transceiver 530, and the transceiver 530 is configured to receive and/or send a signal. For example, the processor 510 is configured to control the transceiver 530 to receive and/or send a signal.

The imaging apparatus 500 is configured to implement the operation performed by the processor 130 in the foregoing method embodiments.

For explanation of related content and beneficial effects of any one of the foregoing imaging apparatuses 500, refer to the corresponding method embodiments provided above. Details are not described herein.

In the embodiments of this application, a specific structure of a body that performs the method provided in the embodiments of this application is not specifically limited, provided that processing can be performed by running a program in which code of the method provided in the embodiments of this application is recorded and according to the method provided in the embodiments of this application.

Aspects or features in embodiments of this application may be implemented as a method, an apparatus, or a product that uses standard programming and/or engineering technologies. The term "product" used in this application may cover a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive).

The various storage media described in this specification may represent one or more devices and/or other machine-readable media configured to store information. The term "machine-readable media" may include but is not limited to a radio channel, and various other media that can store, contain, and/or carry instructions and/or data.

It should be understood that, the processor in embodiments of this application may be a central processing unit (CPU), or may be another general purpose processor, a digital signal processor (DSP), an application specific integrated circuit (ASIC), a field programmable gate array (FPGA) or another programmable logic device, a discrete gate or a transistor logic device, a discrete hardware component, or the like. The general purpose processor may be a microprocessor, any conventional processor, or the like.

It should be further understood that the memory mentioned in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. By way of example but not limitation, a plurality of the following forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general purpose processor, a DSP, an ASIC, an FPGA or another programmable logic device, a discrete gate or a transistor logic device, or a discrete hardware component, the memory (a storage module) is integrated into the processor. It should be further noted that the memory described in this specification is intended to include but is not limited to these memories and any other proper types of memories.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in embodiments of this application, it should be understood that the disclosed system, apparatus, and method may be implemented in other manners. For example, the foregoing apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of this application essentially, or the part contributing to the prior art, or some of the technical solutions may be implemented in the form of a software product. The computer software product is stored in a storage medium, and includes several instructions for instructing a computer device (which may be a personal computer, a server, or a network device) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in embodiments this application shall fall within the protection scope of this application. Therefore, the protection scope of this application shall be subject to the protection scope of the claims.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An imaging method, applied to an optical imaging system, wherein the system comprises a spatial light modulator and at least one lens, and the method comprises:

obtaining a first modulation parameter, wherein the first modulation parameter is determined based on a first distorted image and a first target image, the first distorted image is an image presented after imaging processing is performed on a training image by using the optical imaging system and a screen, the first target image is an image obtained based on a distorted image corresponding to calibrated lattice of a projection at an observation position, and distortion of the first target image falls within a preset range; and controlling the spatial light modulator to modulate an electrical signal of a to-be-imaged first image based on the first modulation parameter, and to generate an imaging light beam that is incident to human eyes through the lens and the screen.

2. The method according to claim 1, wherein the obtaining a first modulation parameter comprises:

controlling the spatial light modulator to modulate an electrical signal of the training image based on an original modulation parameter, to obtain the first distorted image;

adjusting the original modulation parameter, wherein a deviation between the first distorted image and the first target image falls within the preset range after the adjusting; and determining an adjusted original modulation parameter as the first modulation parameter.

3. The method according to claim 1, wherein the obtaining a first modulation parameter comprises:

sending an image of the first distorted image to a server; and obtaining the first modulation parameter from the server.

4. The method according to claim 1, wherein the method further comprises:

obtaining a first correspondence between K modulation parameters comprising the first modulation parameter and K image parameters, wherein a $k^{th}$ modulation parameter is determined based on a distorted image and a target image of a training image having a $k^{th}$ image parameter, the $k^{th}$ modulation parameter corresponds to the $k^{th}$ image parameter, $K \geq 2$, $k \in [1, K]$, values of any two of the K modulation parameters are different, and values of any two of the K image parameters are different; and the obtaining a first modulation parameter comprises:

determining a modulation parameter corresponding to an image parameter of the to-be-imaged first image as the first modulation parameter based on the first correspondence.

5. The method according to claim 4, wherein the image parameter comprises at least one of the following parameters:

an image size, an image color, an image shape, or an image resolution.

6. The method according to claim 1, wherein the method further comprises:

obtaining a second correspondence between M modulation parameters and M positional parameters, wherein the M modulation parameters comprise the first modulation parameter, each of the M positional parameters indicate a positional relationship between the human eyes and the screen, an $m^{th}$ modulation parameter is determined based on a distorted image and a target image of the training image having an mt positional parameter, the $m^{th}$ modulation parameter corresponds to the $m^{th}$ positional parameter, values of any two of the M modulation parameters are different, and values of any two of the M positional parameters are different; and the obtaining a first modulation parameter comprises:

determining a modulation parameter corresponding to a positional parameter of the to-be-imaged first image as the first modulation parameter based on the second correspondence.

7. The method according to claim 6, wherein the positional parameter comprises at least one of the following parameters:

a distance between the human eyes and an incident point of a light beam on the screen, a position of a projection of the human eyes on the screen in a horizontal direction of the screen, or a position of the projection of the human eyes on the screen in a vertical direction of the screen.

8. An optical imaging system, comprising:

a spatial light modulator, configured to modulate an electrical signal of a to-be-imaged first image based on a first modulation parameter to generate an imaging light beam of the to-be-imaged first image, wherein the first modulation parameter is determined based on a first distorted image and a first target image, the first distorted image is an image presented after imaging processing is performed on a training image by using the spatial light modulator and a screen, the first target image is an image obtained based on a distorted image corresponding to calibrated lattice of a projection at an observation position, and distortion of the first target image falls within a preset range; and at least one lens, configured to refract the imaging light beam of the to-be-imaged first image.

9. The system according to claim 8, wherein the spatial light modulator is configured to modulate an electrical signal of the training image based on an original modulation parameter, to obtain the first distorted image;

the optical imaging system further comprises a camera, configured to obtain the first distorted image; and the spatial light modulator is further configured to:

obtain the first distorted image from the camera;

adjust the original modulation parameter, wherein a deviation between the first distorted image and the first target image falls within the preset range after the adjusting; and determine an adjusted original modulation parameter as the first modulation parameter.

10. The system according to claim 8, wherein the optical imaging system further comprises:

a camera, configured to capture an image of the first distorted image; and a transceiver, configured to: send the image of the first distorted image to a server; and receive the first modulation parameter from the server.

11. The system according to claim 8, wherein the spatial light modulator is configured to: obtain a first correspondence between K modulation parameters comprising the first modulation parameter and K image parameters, wherein a $k^{th}$ modulation parameter is determined based on a distorted image and a target image of a training image having a $k^{th}$ image parameter, the $k^{th}$ modulation parameter corresponds to the $k^{th}$ image parameter, $K \geq 2$, $k \in [1, K]$, values of any two of the K modulation parameters are different, and values of any two of the K image parameters are different; and determine a modulation parameter corresponding to an image parameter of the to-be-imaged first image as the first modulation parameter based on the first correspondence.

12. The system according to claim 11, wherein the image parameter comprises at least one of the following parameters: an image size, an image color, an image shape, or an image resolution.

13. The system according to claim 11, wherein the spatial light modulator is configured to: obtain a second correspondence between M modulation parameters and M positional parameters, wherein the M modulation parameters comprise the first modulation parameter, each of the M positional parameters indicate a positional relationship between human eyes and the screen, an $m^{th}$ modulation parameter is determined based on a distorted image and a target image of the training image having an $m^{th}$ positional parameter, the $m^{th}$ modulation parameter corresponds to the $m^{th}$ positional parameter, values of any two of the M modulation parameters are different, and values of any two of the M positional parameters are different; and determine a modulation parameter corresponding to a positional parameter of the to-be-imaged first image as the first modulation parameter based on the second correspondence.

14. The system according to claim 13, wherein the positional parameter comprises at least one of the following parameters:

a distance between the human eyes and an incident point of a light beam on the screen, a position of a projection of the human eyes on the screen in a horizontal direction of the screen, or a position of the projection of the human eyes on the screen in a vertical direction of the screen.

15. The system according to claim 8, wherein the spatial light modulator is configured to: obtain a third correspondence between N modulation parameters comprising the first modulation parameter and N screen parameters, wherein an $n^{th}$ modulation parameter is determined based on a distorted image and a target image that are obtained after the training image is imaged by using a screen having an $n^{th}$ screen parameter, the $n^{th}$ modulation parameter corresponds to the $n^{th}$ screen parameter, values of any two of the N modulation parameters are different, and values of any two of the N screen parameters are different; and determine a modulation parameter corresponding to a screen parameter of a first screen as the first modulation parameter based on the third correspondence, wherein the first screen is a screen used for imaging the to-be-imaged first image.

16. A vehicle, comprising an optical imaging system mounted on the vehicle, the optical imaging system comprising:

a spatial light modulator, configured to modulate an electrical signal of a to-be-imaged first image based on a first modulation parameter to generate an imaging light beam of the to-be-imaged first image, wherein the first modulation parameter is determined based on a first distorted image and a first target image, the first distorted image is an image presented after imaging processing is performed on a training image by using the spatial light modulator and a screen, the first target image is an image obtained based on a distorted image corresponding to calibrated lattice of a projection at an observation position, and distortion of the first target image falls within a preset range; and at least one lens, configured to refract the imaging light beam of the to-be-imaged first image.

17. The vehicle according to claim 16, wherein the spatial light modulator is configured to modulate an electrical signal of the training image based on an original modulation parameter, to obtain the first distorted image;

the optical imaging system further comprises a camera, configured to obtain the first distorted image; and the spatial light modulator is further configured to:

obtain the first distorted image from the camera;

adjust the original modulation parameter, wherein a deviation between the first distorted image and the first target image falls within the preset range after the adjusting; and determine an adjusted original modulation parameter as the first modulation parameter.

18. The vehicle according to claim 16, wherein the optical imaging system further comprises:

a camera, configured to capture an image of the first distorted image; and a transceiver, configured to: send the image of the first distorted image to a server; and receive the first modulation parameter from the server.

19. The vehicle according to claim 16, wherein the spatial light modulator is configured to: obtain a first correspondence between K modulation parameters comprising the first modulation parameter and K image parameters, wherein a $k^{th}$ modulation parameter is determined based on a distorted image and a target image of a training image having a $k^{th}$ image parameter, the $k^{th}$ modulation parameter corresponds to the $k^{th}$ image parameter, $K \geq 2$, $k \in [1, K]$, values of any two of the K modulation parameters are different, and values of any two of the K image parameters are different; and determine a modulation parameter corresponding to an image parameter of the to-be-imaged first image as the first modulation parameter based on the first correspondence.

20. The vehicle according to claim 19, wherein the image parameter comprises at least one of the following parameters: an image size, an image color, an image shape, or image resolution.

* * * * *